Dec. 23, 1969  P. W. SMITH  3,486,131
DUAL CAVITY SIGNAL-MODE LASER WITH FEEDBACK CONTROL
OF MAIN CAVITY RESONANCE
Filed May 26, 1967  3 Sheets-Sheet 1

INVENTOR
P. W. SMITH
BY
Kenneth W. Mateer
ATTORNEY 3,486,131
DUAL CAVITY SINGLE-MODE LASER WITH FEEDBACK CONTROL OF MAIN CAVITY RESONANCE
Peter W. Smith, Little Silver, N.J., assignor to Bell Telephone Laboratories, Incorporated, Murray Hill and Berkeley Heights, N.J., a corporation of New York
Continuation-in-part of application Ser. No. 553,482, May 27, 1966. This application May 26, 1967, Ser. No. 641,646
Int. Cl. H01s 3/10
U.S. Cl. 331—94.5       2 Claims

ABSTRACT OF THE DISCLOSURE

Single-frequency internal mode selection laser having a frequency-stabilized output free from modulation. A dual cavity, four-reflector laser is adjusted for maximum power output. Changes in the monitored power in the primary cavity generate an error signal which locks the main cavity resonance to that of the secondary cavity. Normalization of the monitored power with respect to the output power precludes spurious error signal generation due to changes in the power supply or in the active medium itself.

CROSS REFERENCE TO RELATED APPLICATION

This is a continuation-in-part of my copending application Ser. No. 553,482, filed May 27, 1966, and assigned to the assignee of this application.

BACKGROUND OF THE INVENTION

Field of the invention

This invention relates to optical masers, or lasers, and, more particularly, to single-frequency oscillators in which internal mode selection is effected.

The invention of the laser has made possible the generation and amplification of coherent electromagnetic waves in the optical frequency range, generally considered to extend from the farthest infrared portion of the spectrum through the ultraviolet. Due to the extremely high frequencies associated with wave energy in this light range, the coherent waves produced by lasers are capable of transmitting enormous quantities of information. The resultant extension of the usable portion of the electromagnetic spectrum has greatly increased the number of frequency channels available for communication and other uses.

An important element of the laser, when used as an oscillator, is an optical cavity resonator tuned to the frequency of the stimulated emission. The design of resonators at microwave frequencies is a relatively simple matter, typical structures having dimensions of the order of a single wavelength at the chosen frequency. The application of this design approach to lasers is impractical, however, due to the extremely small wavelengths involved. It is necessary, therefore, to design optical cavity resonators having dimensions which are many thousands of times larger than the output wavelength at the operating frequency. Thus, laser resonators are inherently multimode devices. In typical parallel end mirror resonant cavities, of which the Fabry-Perot is representative, it has been shown that the resonator can be excited in a number of characteristic modes which differ from one another in the number of field variations both along the axis joining the end reflectors and in planes transverse to the axis. All modes which have the same transverse field distribution, regardless of the number of differing axial, or longitudinal, variations, have the same diffraction loss. These "longitudinal resonances" will occur at frequencies for which the length of the cavity corresponds to an integral number of half wavelengths. If, therefore, the negative temperature medium of the laser provides gain over a sufficient frequency range, a plurality of these longitudinal resonances, or modes, can be simultaneously excited even though only the lowest order transverse mode is permitted.

The presence of many mode frequencies in a communications laser is, however, usually disadvantageous. For example, significantly more power is required in a multimode laser than in a single-mode laser to produce the desired well-defined output line which stands out clearly from the background emission. In addition, the excitation of many modes has an adverse effect on the laser's stability, on the modulation process, and on the demodulation process, all of which are important considerations in communications systems.

One object of this invention is, therefore, a laser resonator having a mode system which includes a single-preferred mode among a plurality of resonant modes of the cavity containing the negative temperature medium.

An additional object is a laser stabilized to a single-preferred mode frequency which is free from variations due to changes in power supply voltages or in the gain characteristics of the negative temperature medium.

Description of the prior art

As disclosed in the commonly-assigned, copending application of A. G. Fox, Ser. No. 466,365, filed June 23, 1965, single longitudinal mode discrimination is achieved by dividing the stimulated energy into two portions, each of which is resonated individually in spatially separate optical cavities having one common reflective end member. By designing the auxiliary cavity to exhibit a sufficiently narrowband reflectivity, the unwanted side mode frequencies associated with the main cavity can be suppressed. However, it has been found that the amplitude, as well as the frequency, of the resultant single mode tends to fluctuate with time.

In the past, in order to overcome such undesired changes in a desired center frequency, the main cavity resonance has been "locked" to a more stable element. Both a cavity entirely external to the laser cavity, as well as a cavity in part formed by a portion of the laser cavity, have been proposed as means to improve the stability of the laser output. In each case, however, the principle of operation has required modulation of the resonant frequency of the reference cavity, with the resultant modulation of the laser output. In many cases, a laser output free of modulation is desirable.

SUMMARY OF THE INVENTION

Such a laser output is achieved in accordance with the present invention in a four-mirror cavity arrangement in which changes in the power level within the main cavity are used to correct drifts in the frequency of wave energy deflected out of the cavity. More specifically, an amplitude and frequency-stabilized laser in accordance with the invention is realized in an embodiment having a primary optical cavity with first and second reflective end members disposed normal to the axis of the cavity defined thereby, a negative temperature medium disposed within the primary cavity, and a secondary cavity comprising one of the reflective end members of the primary cavity and a reflective end member disposed with an axis normal to the primary cavity axis. Energy dividing means on the primary cavity axis deflect a portion of the energy propagating toward the common reflector out of the resonator toward utilizing means. The secondary cavity is adjusted for optimum output and the difference between a reference voltage level and a voltage level proportional to the power in the primary cavity is used to lock the primary cavity resonance to the resonance of the secondary cavity.

As will be seen hereinafter, when the power deflected toward the utilizing means is a maximum, small changes in the frequency cause correspondingly small changes in power output. However, these small changes are accompanied by significantly larger changes in the power level in the primary cavity, which is monitored. In its broadest aspect, the laser frequency is stabilized to a resonance of the secondary cavity by generating an error signal in response to primary cavity power level changes induced by frequency variations.

However, it can be readily understood that fluctuations in other parameters, such as power supply voltage or negative temperature medium characteristics, can likewise cause power level changes, and that these changes may be totally unrelated to the resonant frequency of the cavity. To "correct" the cavity resonance in response to such changes in frequency-unrelated phenomena would introduce unwanted frequency shifts. Such spurious frequency drifts are eliminated in accordance with a further feature of the present invention by normalizing the monitored primary cavity power level with respect to the monitored power level deflected toward the utilizing means. In this way, power level changes unrelated to frequency are neutralized prior to error signal generation.

The above and other objects of the present invention, together with its various features and advantages, will become clearer upon reference to the accompanying drawing and to the detailed description thereof.

DETAILED DESCRIPTION

Figure 1:
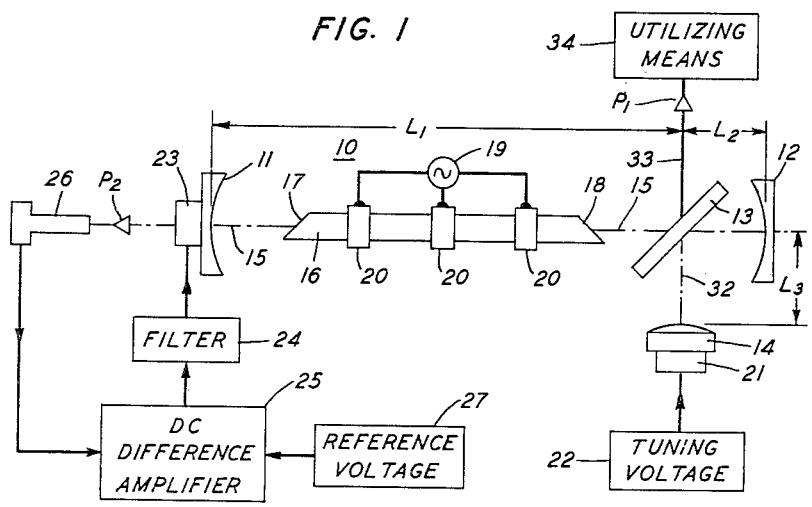
FIG. 1 is a semischematic view of a laser arrangement in accordance with the invention.

The laser 10 shown in FIG. 1 comprises an active meduim disposed within a mode selective optical cavity, as disclosed in the copending commonly-assigned application of A. G. Fox, referred to hereinbefore. A pair of axially-spaced parallel reflectors 11, 12 define the ends of a primary cavity having a length $L_1+L_2$. The surfaces of reflectors 11, 12 can comprise a metallic layer on a dielectric base, or a plurality of alternate layers of material of high and low index of refraction, each layer being one-quarter wavelength thick at the desired frequency of operation. If energy is to be abstracted through cavity extremities, either or both of the reflectors 11, 12 can be partially, typically a few percent, transmissive. Otherwise, their reflectivity is typically made to exceed 99 percent.

A third reflector 14, having a normal which is shown as orthogonal to the axis 15 of the primary cavity, is positioned opposite a beam splitter or energy dividing means 13, thereby forming a secondary cavity with reflectors 12, 14 as extremities and having a length $L_2+L_3$. For certain applications, it can be advantageous to position the energy divider 13 at Brewster's angle. The normal to reflector 14 would then be positioned so that the secondary cavity formed by reflectors 12, 13, and 14 continues to define a resonant structure. The surface of reflector 14 typically is physically similar to that of reflectors 11 and 12, although the physical curvature can be different. Beam splitter 13 can comprise, for example, a half-silvered mirror positioned at 45 degrees to axis 15 to achieve nearly equal division of the incident energy. If desired, other energy dividing ratios can be utilized. For given values of $L_1$, $L_2$, and $L_3$, the reflectors 11, 12, and 13 are chosen to have curvatures which are equal to those of the light beams incident thereupon.

The negative temperature or active medium, which in the arrangement depicted is a gas or a gas mixture, is disposed between reflector 11 and beam splitter 13. So located, the active medium physically is exclusively in the primary cavity. The active medium is shown contained within an elongated tube 16 having end surfaces 17, 18 oriented substantially at Brewster's angle to the energy beam which passes therethrough along axis 15. The gaseous medium can comprise, for example, a mixture of helium and neon excited by a radio frequency source 19 coupled to conductive straps 20 which encircle tube 16. Gaseous lasers of this type and their principles of operation are now well known in the art. If desired, two identical gaseous media can be used with a methane gas cell between them to suppress unwanted $3.39\mu$ oscillations. It is to be understood, however that the invention can be practiced with liquid or solid state active media as well as with gaseous media of differing compositions. Furthermore, the excitation shown in FIG. 1 can be of the direct-current type if appropriate.

Reflector 14 is shown mounted on a base member 21, which can be a piezoelectric material whose physical dimensions are controllable over a limited range by the application of a tuning voltage supplied from source 22. As will be seen, the resonant frequency of the auxiliary cavity of length $L_2+L_3$ can be then controlled.

Reflector 11 is also mounted on a piezoelectric base member 23 to which a voltage from direct-current difference amplifier 25 can be applied. This voltage, which passes through low pass filter 24, is generated by comparing, in direct-current difference amplifier 25, the output power level $P_2$ from phototube 26 with a reference voltage from source 27. Utilizing means 34, which can be an amplifier, a modulator or other communications system component, is adapted for use with an unmodulated input and is positioned to receive power $P_1$.

Figure 2:
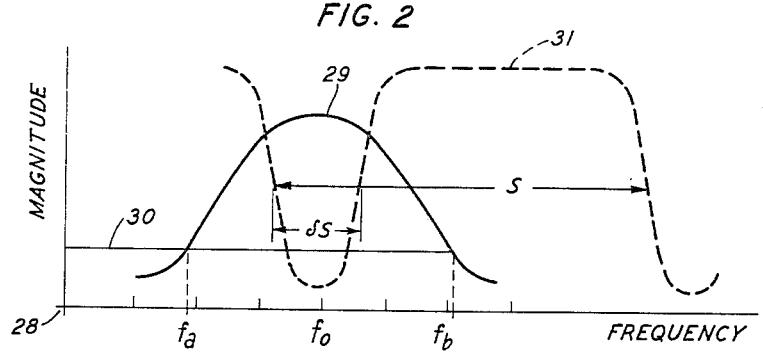
FIGS. 2 and 3 are graphical representations helpful in understanding certain principles of the invention.

In FIG. 2, the longitudinal mode frequencies of the primary cavity for the lowest order transverse mode are indicated by the short vertical lines along the abscissa of coordinate system 28. The width of the laser transition in a conventional optical maser is shown by solid curve 29 which is a plot of gain per pass of a light beam through a typical active medium versus frequency. The threshold at which gain exceeds the losses due to scattering, reflection, and the like is indicated by horizontal solid line 30. It can therefore be seen that all five modes shown having frequencies between $f_a$ and $f_b$ can oscillate unless measures are taken to suppress them. It also can be easily appreciated that, since a single-frequency output is usually technically desirable, such suppression measures are advantageous more often than not.

One simple way of selecting a single mode is to reduce the optical gain across the entire emission band or, equivalently, to raise the threshold for oscillation until only a narrow portion of the line exceeds it. It is also possible to reduce the length $d$ of the cavity, thereby increasing the frequency separation between the modes. Unfortunately, such measures have the undesirable effect of reducing the available output power.

In accordance with the principles of operation of the three-end mirror cavity, however, the energy in a beam propagating to the left along axis 15 in FIG. 1 toward divider 13 is split thereby, a portion proceeding on through the active medium to primary cavity reflector 11, and the remainder proceeding to auxiliary cavity reflector 14, disposed normal to the auxiliary cavity subaxis 32. Thus it can be seen that a secondary resonance can be established for energy propagating between reflectors 12 and 14 via beam splitter 13. The secondary resonance characteristic affects the losses experienced by energy in the primary cavity formed by reflectors 11 and 12, and is used to suppress unwanted longitudinal modes. In particular, the secondary cavity is made to have a high reflectivity only over a band of frequencies which is much narrower than the oscillation bandwidth $f_b - f_a$ shown in FIG. 2.

With the separations among reflectors 11, 12, 14, and beam splitter 13 defined as $L_1$, $L_2$, and $L_3$, respectively, the energy deflected, $P_1$, from beam splitter 13 in a direction parallel to axis 33 at a given wavelength $\lambda$ can be written $$P_1 = \frac{4R \sin^2\left[\frac{2\pi}{\lambda}(L_2+L_3)\right]}{T^2 + 4R \sin^2\left[\frac{2\pi}{\lambda}(L_2+L_3)\right]}$$

where R and T are, respectively, the reflectance and transmittance of the beam splitter. The reflectors 11, 12, and 14 are assumed to have $R=1$. By tuning the auxiliary cavity to have a high reflectivity at $f_0$, as seen from the primary cavity, a small change in $\lambda$ will result in a large change in the loss of side mode energy, since such laser modes, typically spaced in frequency the order of 150 megacycles from the desired center frequency of operation, $f_0$, are characterized by a significantly lower reflection coefficient. The tuning of the auxiliary cavity can be achieved by proper adjustment of either $L_2$ or $L_3$, although it is often more convenient to vary $L_3$ and therefore to leave the primary cavity length unchanged. The total length $L_2+L_3$ of the auxiliary cavity normally will be selected to be much less than the total length $L_1+L_2$ of the primary cavity.

In FIG. 2, the effect of the addition of the auxiliary cavity is indicated by the loss curve represented by dashed curve 31, which is a portion of the periodic reflection characteristic of the auxiliary cavity. It is convenient to consider the auxiliary cavity as a composite reflector normal to the main laser beam propagating along axis 15. Such a reflector is characterized by a periodic narrow band reflectivity which, when centered at the desired frequency $f_0$ of the primary cavity, acts as a highly reflective end mirror with associated low loss. All other frequencies within the period of the auxiliary cavity experience lower reflectivity and accordingly higher loss, as depicted in FIG. 2. The periodicity S, of curve 31 is $$c/(L_2+L_3)$$

where $c$ is the velocity of light. The width of the resonance, $\delta S$, is determined primarily by the reflectivity of the beam splitter 13. For higher reflectivities, the width $\delta S$ is less. Thus in an optical maser arrangement in which the side frequencies are closely spaced, it may be necessary to raise the reflectivity of the divider 13 to exceed the 50 percent mentioned hereinbefore in order to prevent the adjacent side frequencies of the main cavity from falling within the low loss region of curve 31. When the auxiliary cavity is properly tuned, losses at mode frequencies removed from the desired frequency $f_0$ are increased, thereby reducing the net gain below the threshold at which oscillation can be sustained. The result is more intense emission at the single desired frequency.

The operation of the feedback system in accordance with the present invention can be explained by further reference to FIG. 1. The three mirrors 12, 13, 14 forming the auxiliary cavity are again thought of as a single mirror of variable reflectivity as already discussed. When the three-mirror end reflector is tuned to resonate at a given frequency, all of the power incident at this frequency is reflected back into the laser cavity, and none is coupled out, i.e., $P_1=0$. As the tuning of the three-mirror end reflector is changed, however, some of the incident power is deflected out of the system and $P_1 > 0$. For sufficiently large detuning, the loss due to this power being coupled out of the system is so large that the laser will not oscillate. Further detuning in the same direction will cause oscillation to start at a frequency close to the next resonance of the laser cavity.

The feedback control phenomenon can be understood if the power out at mirror 11 is designated $P_2$ and the relative values of $P_1$ and $P_2$ are monitored. Under the conditions for which the three-mirror reflector is tuned to resonate at a laser cavity resonance, all of the incident power is reflected back into the laser cavity and $P_1=0$. At the same time, however, since this corresponds to the highest reflectivity of the three-mirror system, the power in the main laser cavity, and hence $P_2$, is a maximum. As the tuning of the three-mirror end reflector is changed in either direction, the effective reflectivity decreases as a larger fraction of the incident power is coupled out of the system, and $P_2$ decreases. Finally oscillation stops and both $P_1$ and $P_2$ are zero. It is clear, then, that $P_1$ goes through a maximum during this process and this maximum occurs when the detuning results in the optimum output coupling from the system.

Figure 3:
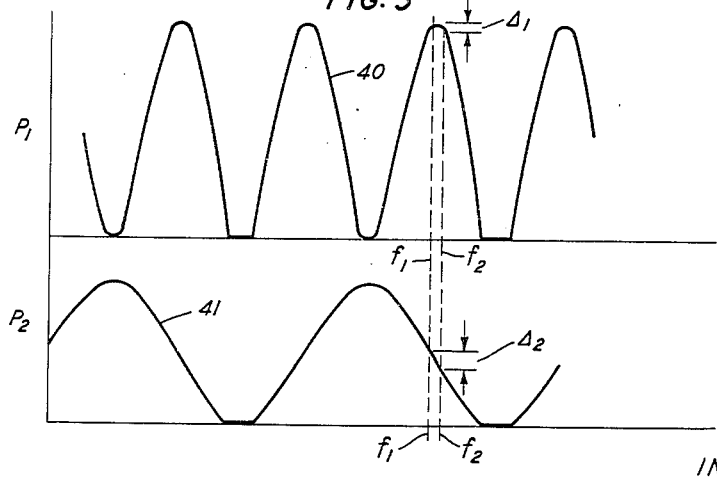

FIG. 3 shows simultaneous experimental observations of $P_1$ and $P_2$ as a function of the three-mirror end reflector tuning using the experimental laser set up of FIG. 1, $P_1$ being depicted as curve 40 and $P_2$ as curve 41. The expanded scale used shows clearly the relationship between $P_1$ and $P_2$ already described. If the laser is tuned to operate at a frequency $f_1$ corresponding to one of the maxima of $P_1$, a small frequency shift of $(f_2-f_1)$ causes a small amplitude variation, $\Delta_1$, in $P_1$, but a much greater variation, $\Delta_2$, in $P_2$. The sign of the change in $P_2$ depends on the direction of this frequency shift. Thus, by monitoring $P_2$ when the laser is tuned to a maximum of $P_1$, a signal can be obtained whose amplitude increases if the frequency of the laser drifts in one direction and decreases if the frequency drifts in the other. This signal can then be used to obtain a correction signal to be applied to a piezoelectric or other device to stabilize the frequency of the laser.

It thus can be seen that the three-mirror cavity is being used as a stable reference cavity, and the main laser cavity frequency is being locked to the frequency of the reference cavity. The three-mirror cavity thus should be made as stable as possible. Any slow drifts in its resonant frequency due to thermal effects, for example, could be corrected by using a slow time constant feedback loop and deriving a signal from an external absorption cell. In this way, a high degree of frequency stability relative to the center of the atomic gain curve can be maintained.

An experimental model of the frequency-stabilized laser has been built using helium-neon as the active medium. The dimensions were: $L_1+L_2=280$ cm., $L_2+L_3=10$ cm. Mirrors 11 and 12 were concave with a radius of curvature of 14.00 meters and mirror 14 was convex with a radius of 14.85 meters. Mirror 13 was a plane mirror with a reflectivity of 65 percent at 45 degrees. The laser used two 130 cm., 4 mm. bore tubes in tandem and the space between the two tubes was filled with methane gas to reduce simultaneous $3.39\mu$ oscillation. Magnets were also placed along the length of the laser tubes for the same purpose. With this configuration, it was found that 50 mw. of single-mode output power could be obtained. This power had a tendency to appear in a second-order transverse mode, but by aperturing the beam slightly, 45 mw. of power could be obtained reliably in the fundamental transverse mode. These output powers were measured using a solar cell which had been calibrated against a National Bureau of Standards-calibrated thermopile. Single-mode operation was checked by observing the output with a scanning interferometer.

The mechanical mounting for mirrors 11, 12, and 14 was made as stable as possible by using massive mirror mounts and bolting them to Invar top and bottom plates. The interior spaces in the mirror mounts were filled with silicone rubber and the whole assembly was surrounded with a lead cover "floating" on a layer of foam rubber.

The transducer elements 21, 23 were 1 inch x 1 inch piezoelectric ceramic cylinders. The time constant for the first mechanical resonance of the transducer-mirror combination was in the neighborhood of 1 kc. and the low pass filter in the feedback system was adjusted so that the loop gain fell below one at this frequency. Thus the experimental feedback system was only capable of appreciably correcting for mechanical vibrations at frequencies well below 1 kc. Nevertheless, by observing the fluctuations in the output power, it was found that the laser cavity could be locked to the reference cavity to within 1 mc. or about ±2 parts in $10^9$. The laser was in a normal laboratory environment, although the experiment was conducted on a special stable concrete table, and care was taken to shield the mirror mounts from acoustical vibrations.

The feedback system adjusts the operating point of the laser so that $P_2$ generates in the phototube a voltage almost equal to the reference voltage 27. Thus by varying the reference voltage, it is possible to vary continuously the operating point and thus $P_1$. Normally the reference voltage is adjusted so that $P_1$ is near maximum.

Figure 4A:
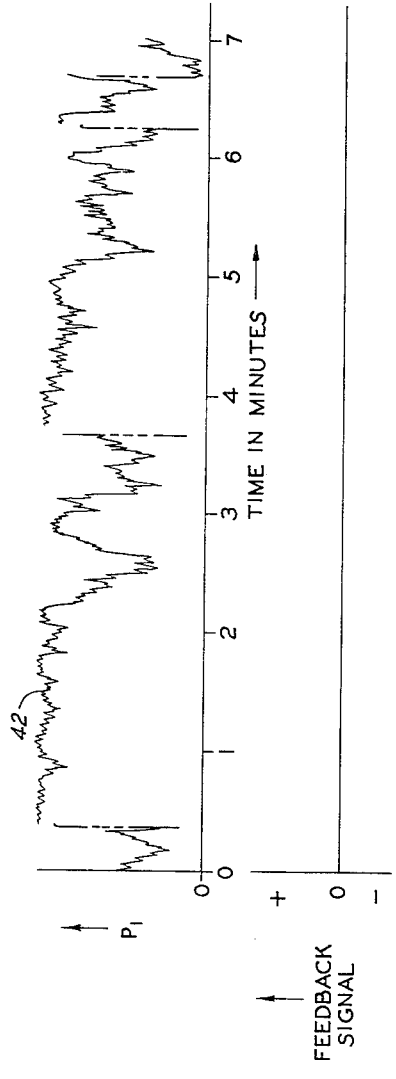
FIGS. 4A and 4B are graphical illustrations of the unstabilized and stabilized outputs of the arrangement of FIG. 1.
Figure 4B:
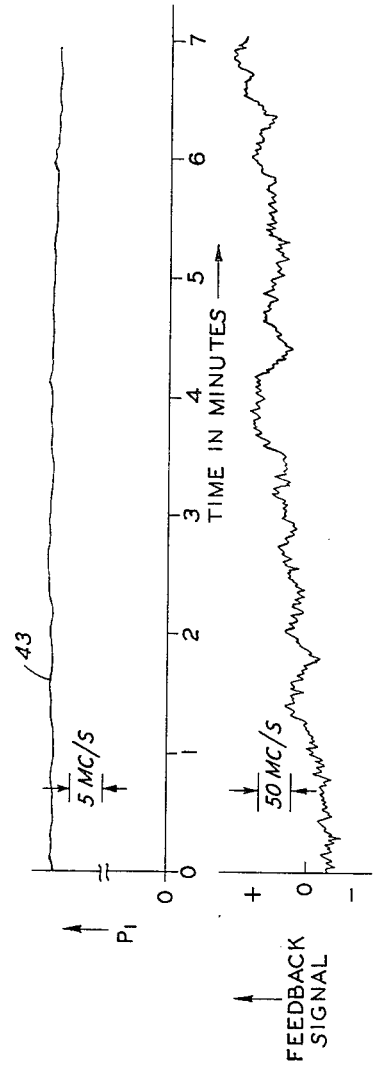

FIG. 4A shows a plot of the output power as a function of time without feedback. It can be seen that the output power represented by jagged line 42 changes considerably during the course of a minute. FIG. 4B shows as curves 43, 44 the effect of the feedback system. Since the magnitude of the mechanical movements can be found from the feedback signal by noting that a frequency chance of $c/2(L_1+L_2)$ [=54 mc./s.] corresponds to a change in laser cavity length of $\lambda/2$, the laser cavity can be seen to be locked to the reference cavity to within ±1 mc./s. Because the chart recorder used would not respond to frequencies above about 70 c./s., a check was made with an oscilloscope to verify that there were no high frequency fluctuations in the laser output that would indicate a short-term stability worse than ±1 mc./s.

Figure 5:
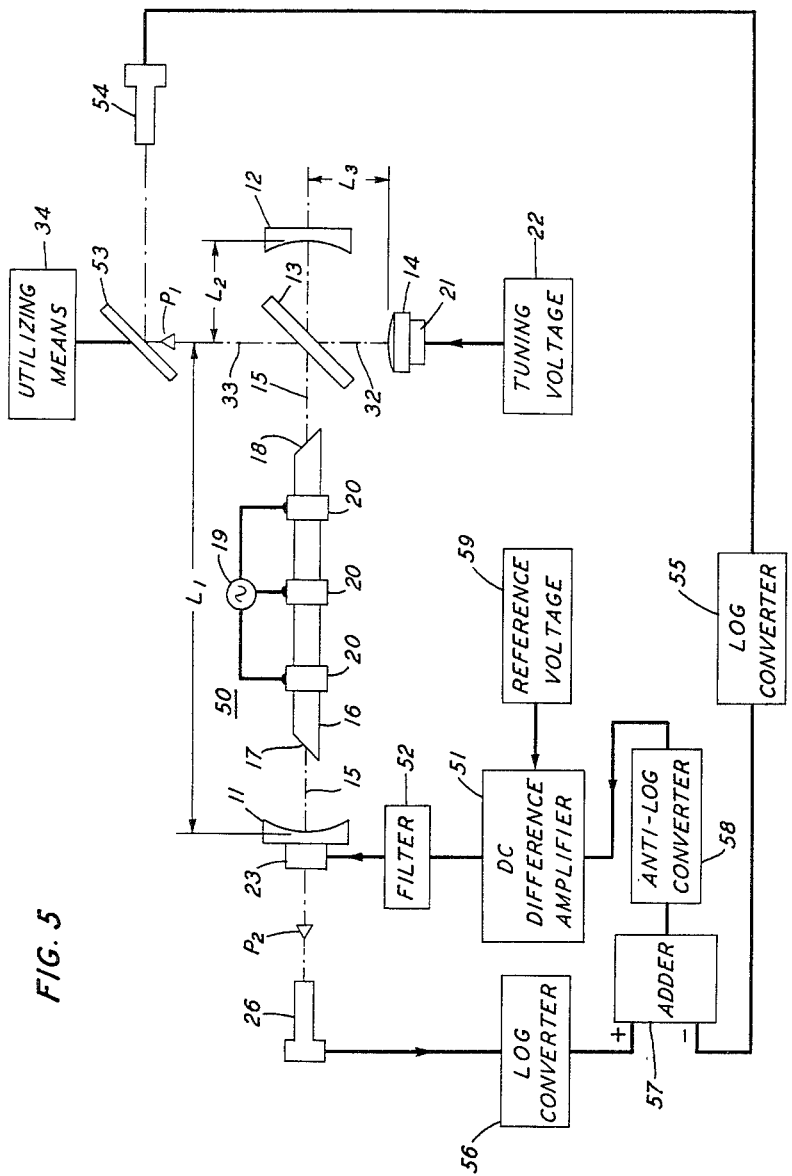
FIG. 5 is a semischematic view of the laser arrangement of FIG. 1 including signal normalization.

FIG. 5 depicts a stabilized single-frequency laser in which normalization of the power levels prior to error signal generation is effected. The basic arrangement of FIG. 5 is similar to that of FIG. 1, and therefore corresponding reference numerals have been carried over wherever appropriate.

The stabilized laser 50 shown in FIG. 5 comprises an active medium disposed within a mode selective optical arrangement including a primary and a secondary resonant cavity. A pair of axially-spaced parallel reflectors 11, 12 define the ends of the primary cavity, which has a length $L_1+L_2$. As before, the surfaces of the reflectors can comprise metallic layers or multiple dielectric layers. A third reflector 14, having a normal which is shown as orthogonal to axis 15 of the primary cavity, is positioned opposite a beam splitter or energy dividing means 13, thereby forming a secondary cavity with reflectors 12, 14 as extremities and having a length $L_2+L_3$. For certain applications, it can be advantageous to position the energy divider 13 at Brewster's angle, in which case the reflector 14 would be positioned so that it is normal to the deflected energy and so that the secondary cavity continues to define a resonant structure. The curvatures and other physical characteristics are as described hereinbefore with reference to FIG. 1. Beam splitter 13 can be positioned at 45 degrees to axis 15 to achieve equal power division of the incident energy. Other dividing ratios and other positionings also can be used.

The negative temperature or active medium, which is depicted in FIG. 5 as a gas or gaseous mixture, is disposed on axis 15 between reflector 11 and beam splitter 13. The active medium is shown contained within an elongated tube 16 having end surfaces 17, 18 oriented substantially at Brewster's angle to the energy beam which passes therethrough along axis 15. The gaseous medium can comprise, for example, a mixture of helium and neon excited by a radio frequency source 19 coupled to conductive straps 20 which encircle tube 16. It is to be understood that liquid or solid state active media, as well as gaseous media of differing compositions, can be used. Furthermore, the excitation shown in FIG. 5 can be of the direct-current type if appropriate.

Reflector 14 is shown mounted on a base member 21, which can be a piezoelectric material whose physical dimensions are controllable over a limited range by the application of a tuning voltage supplied from source 22. In this manner, the resonant frequency of the auxiliary cavity of length $L_2+L_3$ can be controlled by the magnitude of the applied tuning voltage.

Reflector 11 is mounted on a piezoelectric base member 23 to which a voltage from direct-current difference amplifier 51 can be aplied through low pass filter 52. In the embodiment of FIG. 1, the voltage applied to the piezoelectric member 23 is generated by comparing the power level $P_2$ from phototube 26 with a fixed reference voltage. $P_2$ is thus proportional to the power level within the primary cavity. As explained with reference to FIGS. 2 and 3 hereinbefore, changes in the level of $P_2$ are related to changes in the frequency of the energy within the cavity. Thus, in the arrangement of FIG. 1, detected changes of $P_2$ are presumed to indicate frequency drift from the desired single-frequency output, and an error voltage to correct the apparent drift is applied.

In certain situations, however, changes in $P_2$ are not indicative of frequency diviations. For example, the level of pumping source 19 can vary, resulting in a corresponding variation in the generated power level in the laser, even though the frequency has not changed at all. Similarly, temperature variations and air currents in the vicinity of the laser cavity can cause power level changes which are not necessarily linked with frequency deviations.

The arrangement of FIG. 5 overcomes the spurious error signal generation due to these variations which are not related to frequency by comparing the power level $P_2$ with the power level $P_1$ which is directed toward the utilizing means 34. This comparison, and accompanying normalization, eliminates unnecessary and undesirable frequency adjustments which otherwise would be introduced. The normalization process eliminates these errors since a drop in power $P_2$ due to a variation of the gain or loss in the cavity will be accompanied by a proportional drop in power $P_1$. By monitoring $P_1$, and dividing $P_2$ by $P_1$ before generation of the error voltage, only frequency dependent changes in $P_2$, for which the drop in $P_1$ is not proportional, will produce a correction voltage.

In FIG. 5, a power dividing means 53 is positioned in the path of $P_1$. This means, which can comprise a partially reflective plate, transmits a major portion of incident power $P_1$ and reflects a small portion thereof toward phototube 54. The voltages developed by phototubes 54 and 26 are applied, respectively, to log converters 55, 56, the outputs of which are combined in adder 57. The output of converter 55 is rendered negative and the resultant operation of adder 57 can therefore be expressed as Log $P_2$–Log $P_1$, which corresponds to division of $P_2$ by $P_1$. The output of adder 57 is converted back to a voltage signal of magnitude corresponding to the quotient $P_2/P_1$ by anti-log converter 58. This normalized signal is then compared in direct-current difference amplifier 51 with reference voltage 59, and the resultant error signal is applied through filter 52 to base member 23. The presence of an error signal indicates a frequency drift within the laser cavity. The normalization procedure has effectively eliminated the effects of power level changes in the laser which are unrelated to frequency.

The frequency-stabilized laser has been described with reference to an output power $P_2$ taken through one of the end reflectors of the primary cavity. If it is desired, the end reflectors can be made maximally reflective, and the primary cavity power can be monitored at either of the Brewster angle windows 17, 18. In all cases it is understood that the above-described arrangements are only illustrative of the principles of the invention. Numerous and varied additional arrangements can be devised by those skilled in the art without departing from the spirit and scope of the invention.

I claim:
1. A frequency stabilized optical maser comprising
a primary elongated optical cavity resonator having an axis and first and second reflective end members,
a negative temperature medium and an optical dividing means, each disposed on said axis between said end members, said means being oriented to divert from said cavity a portion of the energy propagating along said axis from said first member towards said medium,
a third reflective end member disposed external to said primary cavity in the path of said diverted energy for forming an auxiliary optical cavity resonator having a limited portion common with the primary optical cavity resonator,
means for sampling the energy in said primary optical cavity resonator and the energy diverted from the primary optical cavity resonator by the energy dividing means and for deriving from such samples a normalized sample,
means for comparing the normalized sample with a reference value for deriving an error signal,
and means for utilizing the error signal for positioning the second member.

2. An optical maser in accordance with claim 1 in which the means for deriving a normalized sample includes means for subtracting the logarithm of the level of the level of the sample which is a measure of the diverted energy from the logarithm of the level of the sample which is the measure of the energy in the primary optical cavity resonator.

References Cited

UNITED STATES PATENTS

| | | | |
|---|---|---|---|
| 3,134,837 | 5/1964 | Kisliuk et al. | 331—94.5 |
| 3,361,990 | 1/1968 | Gordon et al. | 331—94.5 |
| 3,395,365 | 7/1968 | Fork | 331—94.5 |

ROY LAKE, Primary Examiner

S. H. GRIMM, Assistant Examiner

U.S. Cl. X.R.

331—1